April 18, 1961

E. A. CUNNINGHAM, JR 2,980,075

DIAPHRAGM EQUALIZING MEANS AND VALVE
ASSEMBLIES FOR TOTALIZERS

Filed March 2, 1959

Edwin A. Cunningham Jr.
INVENTOR.

BY Gerald B. Tjoflat
His attorney

April 18, 1961 E. A. CUNNINGHAM, JR 2,980,075
DIAPHRAGM EQUALIZING MEANS AND VALVE
ASSEMBLIES FOR TOTALIZERS
Filed March 2, 1959 3 Sheets-Sheet 3

Edwin A. Cunningham Jr
INVENTOR.
BY Gerald B. Tjoflat
His Attorney

United States Patent Office 2,980,075
Patented Apr. 18, 1961

2,980,075
DIAPHRAGM EQUALIZING MEANS AND VALVE ASSEMBLIES FOR TOTALIZERS
Edwin A. Cunningham, Jr., Whitehall, Pa., assignor to Hagan Chemicals & Controls, Incorporated, Pittsburgh, Pa., a corporation of Pennsylvania
Filed Mar. 2, 1959, Ser. No. 796,637
4 Claims. (Cl. 121—48)

This invention relates to pressure sensitive signal developing devices and more particularly to ratio totalizers and to improvements thereon.

An object of this invention is to provide a diaphragm actuated valve which is particularly suited for use in totalizers, comprising a housing having a poppet valve assembly therein, a diaphragm adapted to actuate the valve in one direction from a neutral position by an externally applied force so as to develop a pressure and admit pressure to the housing, and which is returned to neutral position when the force of the pressure acting on the diaphragm balances the externally applied force, and to actuate the valve to exhaust position when the force of the pressure on the diaphragm exceeds the externally applied force; to provide a valve assembly which is so constructed that a plus or minus bias may be applied to the diaphragm internally of its housing but which may be adjusted from the exterior thereof; and to provide a valve assembly which is so constructed that it may be adjusted without disturbing the pressure supply connection thereto.

Another object of the invention is to provide a totalizer comprising a beam mounted on a fulcrum and provided with at least one diaphragm housing assembly on each side of the fulcrum, the diaphragms being responsive to signal pressures and developing opposed turning moment forces on the beam; and to provide a device in which the diaphragms may be provided with means whereby the effective area of one diaphragm may be adjusted relative to the effective area of the other without throwing the beam off level or neutral position.

A still further object is to provide a totalizer of the type set forth having means whereby the areas of opposed diaphragms of a plurality of diaphragm housing assemblies may be equalized in a simple and efficient manner.

A still further object is to provide a totalizer of the type set forth in which there is a pair of opposed diaphragm housings, the diaphragms of which are rigidly connected by a coupling member, the coupling member being provided with means for equalizing the effective areas of the diaphragms simultaneously so as to increase the effective area of the one while decreasing that of the other and then securing the rigid member to the beam.

The foregoing and other objects of the invention will be apparent to those of ordinary skill in the art to which the invention pertains, taken in connection with the accompanying drawings.

Figure 1:
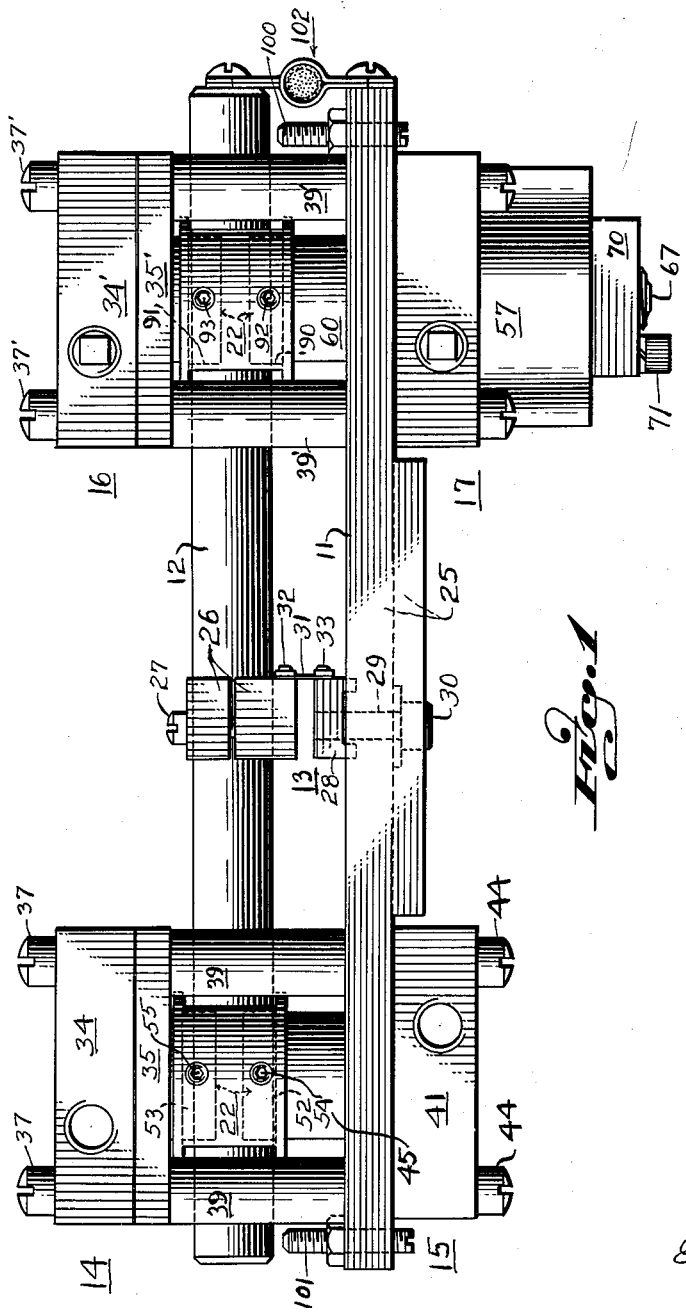
Figure 1 is a view in side elevation of a totalizer illustrating an improved diaphragm area adjusting and equalizing means and an improved diaphragm housing and valve assembly, arranged and constructed in accordance with embodiments of the invention.
Figure 2:
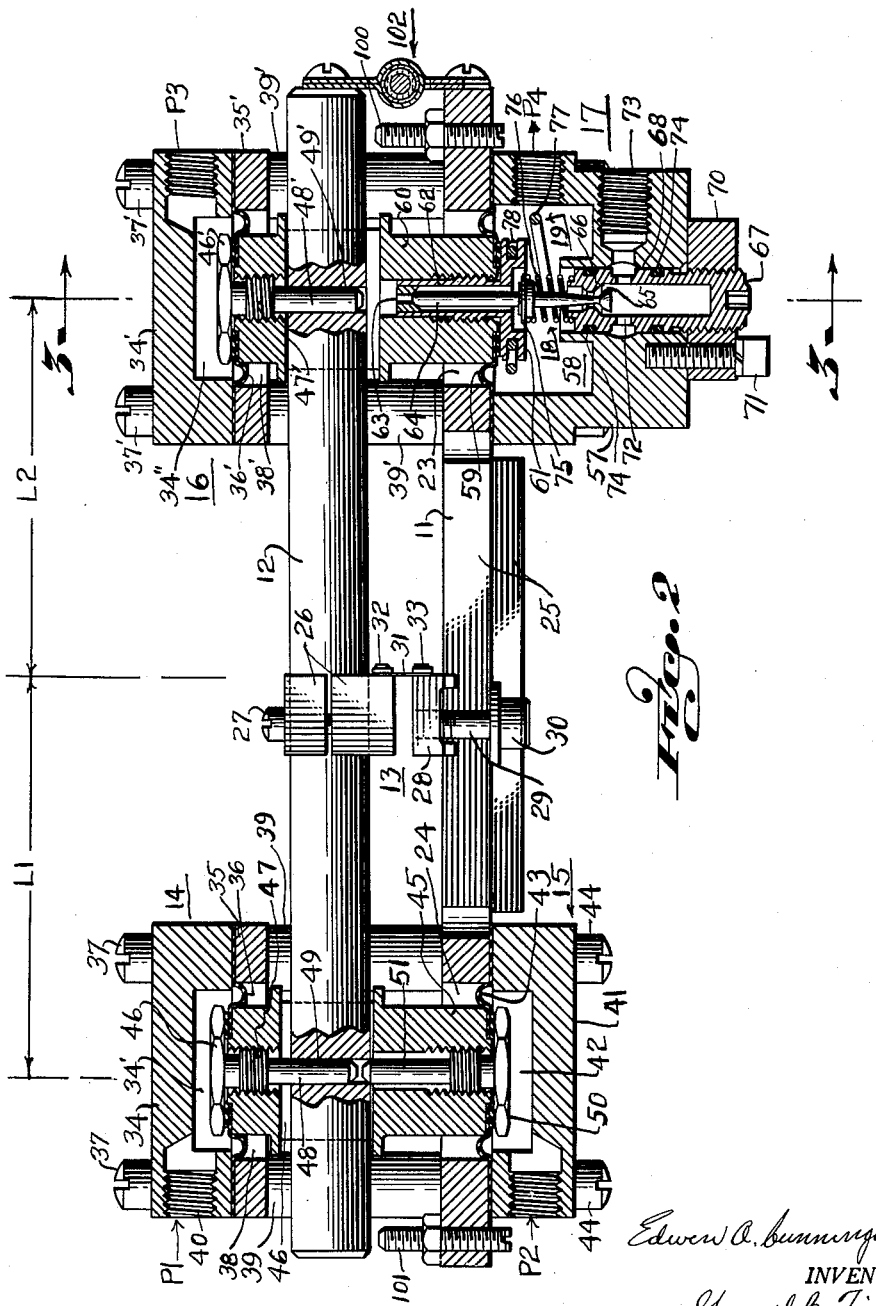
Fig. 2 is a view in longitudinal vertical section of the device shown in Fig. 1.

In the drawings, a ratio totalizer 10 is shown that comprises a base or frame member 11, a beam 12 and a fulcrum 13 secured to the base and beam, respectively. The totalizer also comprises one or more pressure responsive diaphragm assemblies that are arranged to exert forces on the beam at opposite sides of the fulcrum. In the particular form of totalizer illustrated, there are opposed diaphragm assemblies 14 and 15 and opposed diaphragm assemblies 16 and 17 at the left and the right sides, respectively, of the fulcrum. One of these assemblies, for example the assembly 17, may include a poppet valve assembly 18 and an adjustable diaphragm biasing means 19 located within the housing and which is adjustable by means 81 operable from the outside of the housing assembly.

The diaphragm assemblies are provided with means 22 whereby the areas of the diaphragms that develop opposed turning moments about the beam fulcrum may be equalized conveniently, accurately and with ease.

In devices, such as described, it is extremely difficult to have two opposed diaphragms of exactly the same effective areas by construction. Therefore, a convenient means must be provided whereby these areas may be made equal. If the areas are unequal, the turning moments of the forces developed by the diaphragms and applied to the beam 12 will not be proportional to the pressures acting on them, nor will the forces which produce the turning moments be linearly or directly proportional to the difference between the pressures acting on opposed force producing diaphragms. In devices of this type, the effective diaphragm areas sought to be achieved are preferably unit areas, for example 1 square inch. If the diaphragms can be conveniently and precisely adjusted to equality, then each one will develop the identical force at the identical pressure, or the net force will be directly proportional to the difference between the pressures acting on the diaphragms.

As will be shown infra, the means 22 make it possible to conveniently and precisely adjust the effective areas of the diaphragms to equality.

Frame 11 comprises a rectangular plate having apertures 23 and 24 adjacent the ends thereof to accommodate the means by which the diaphragms of the assemblies 14—17 are connected to the beam 12. The plate is provided with a slot 25 along which the fulcrum 13 may be adjusted.

Beam 12 comprises a rigid rod which may be round in section throughout but more especially at the ends thereof for reasons that are readily understood.

The fulcrum 13 comprises a split block-clamp 26 that embraces beam 12 and is provided with clamp screws 27 for securing the clamp to the beam at any desired position. It also includes a block 28 secured by a screw 29 to the base, the screw 29 extending through the slot 25 and being provided with a relatively large head 30 that spans the same. A fulcrum member 31 in the form of a leaf spring is secured at its ends to the lower part of clamp-block 26 and to the base block 28 by screws 32 and 33.

The diaphragm assembly 14 comprises a bonnet or housing 34 having a chamber 34' of substantially circular cross section and a clamp member 35 between which the marginal edge of a diaphragm 36 is clamped by screws 37. The clamp member 35 has a circular aperture 38 to accommodate the free or active portion of the diaphragm. The bonnet and clamp member are supported on tapped corner posts 39 into which the clamp screws are threaded. The bonnet is provided with a threaded port 40 to which a signal pressure pipe may be connected.

The diaphragm assembly 15 comprises a bonnet or housing 41 having a chamber 42 of substantially circular cross section, and a diaphragm 43, the marginal edge of which is clamped between the plate 11 and the bonnet by screws 44 that extend through the plate and are threaded into the corner posts 39.

The diaphragms 36 and 43 are connected to each other by a rigid member 45 having a bore 46 through which beam 12 extends. As shown, the bore is larger than the rod so that there may be relative motion between the member 45 when it is being adjusted to equalize the effective areas of the diaphragms 36 and 43. The central portion of the diaphragm 36 is clamped between one end of member 45 and the enlarged head 46 of a screw 47 which is threaded into the former. The diameter of the end of the member 45 engaging the diaphragm 36 fixes the length of the slack portion of the diaphragm and the effective area thereof, depending on the amount member 45 extends into the bonnet chamber 34'.

An extension 48 of screw 47 is received in a cylindrical aperture 49 in the beam 12 to prevent endwise motion thereof.

The central portion of diaphragm 43 is clamped to the lower end of member 45 in a similar manner by a large headed screw 50 having an extension 51 extending into the aperture 49.

Figure 3:
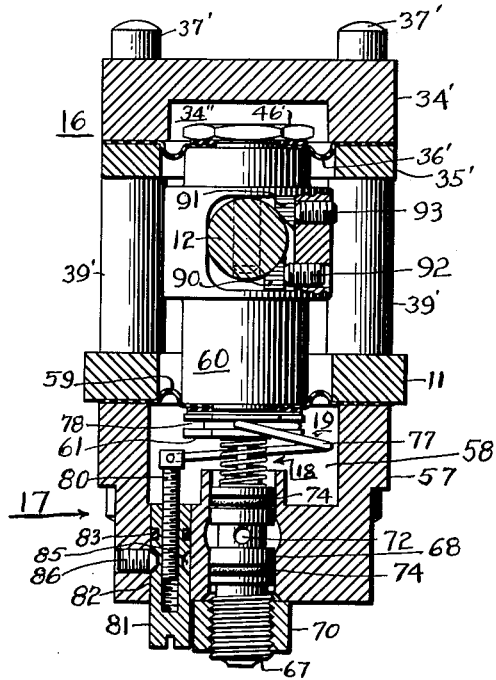
Figs. 3 and 4 are views in section taken on line 3—3 of Fig. 2, illustrating, respectively, the diaphragm area adjusting means of opposed diaphragms in their extreme adjusted positions.
Figure 4:
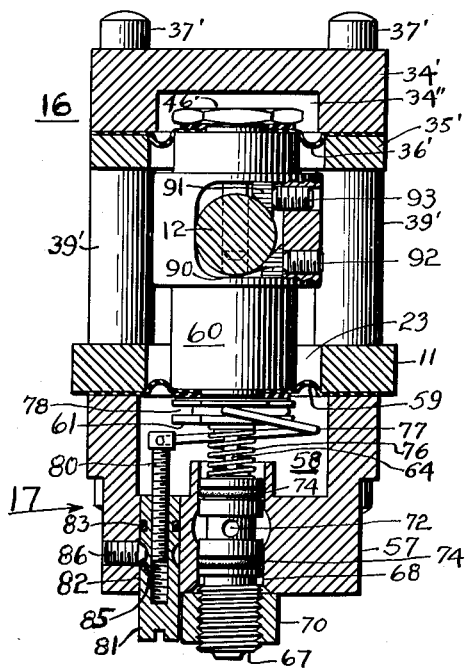

Member 45 is secured to the beam 12 by the means 22. Means 22 comprises a pair of wedges 52 and 53 disposed to engage opposite sides of the beam. These wedges are adjustable by means of screws 54 and 55. The shape and form of the wedges are the same as that of the wedges shown in Figs. 3 and 4 and associated with units 16 and 17. By loosening one of the screws, 52 or 53, and tightening the other, the member 45 may be shifted at right angles to beam 12 thereby moving one diaphragm into its bonnet chamber more or less and the other diaphragm out of its bonnet chamber by the same amount. Thus, if screw 54 is loosened to free wedge 52 and the screw 53 is tightened to take up the slack, wedge 53 is moved more to the top of beam 12, which being stationary, causes member 45 to move upwardly thereby moving the central portion of diaphragm 34 into chamber 34' and increasing the effective area of the diaphragm by converting more of its slack portion into active portion. At the same time, more of the central portion of diaphragm 43 is moved out of its chamber 42 thereby making more of its slack portion ineffective and decreasing the area of that diaphragm. By means of these wedges, the effective areas of diaphragms 36 and 43 can be equalized so that at equal pressures they will exert equal forces, or if the pressures are unequal, the resultant force will be directly proportional to the difference between those pressures. When the wedges 52 and 53 are forced tightly by the screws 54 and 55, against the beam 12, the beam is wedged between the wedges and one side of the aperture 46, as shown in Figs. 3 and 4.

The diaphragm housing assembly 16 is similar in all respects to assembly 14. Therefore similar parts have been given the same reference characters with primes affixed.

The unit 16 is mounted on corner posts 39' and secured thereto by the screws 37'.

The diaphragm and valve assembly 17 comprises a housing or bonnet 57 that is substantially deeper than the housings of units 14, 15 and 16 in order to accommodate the valve assembly 18 thereof.

The housing 57 has a chamber 58 in which a pressure is established by the valve. The established pressure is proportional to the net turning moment on the beam as developed by the joint action of units 14, 15 and 16. The assembly 17 includes a diaphragm 59, the marginal edge of which is clamped between a plate 11 and the open end of the member 57. The central portion of the diaphragm is clamped between the lower end of a rigid member 60 and the head 61 of an exhaust valve having a stem 62 threaded to the member 60. The stem 62 is hollow, as shown, and is provided with an exhaust port 63 at its outer end. The rigid member 60 is connected to the diaphragms 36' and 59, as shown.

The valve assembly includes a stem 64, the upper end of which controls the exhaust port 63. The opposite end of the stem is provided with a valve 65 that controls an inlet port 66. The inlet port 66 is formed in a hollow member 67 that is disposed in a bore 68 in the head of the bonnet 57. The outer end of the member 67 is threaded to accommodate a nut 70 by means of which member 60 may be adjusted into or out of its bore. The nut 70 may be secured by a screw 71 to the bonnet head when it has been adjusted. The member 68 is provided with ports 72 that communicate with an inlet port 73 in the side of the head of bonnet 57, and sealed with rings 74 located on each side of the port as shown.

The stem 64 is provided with a collar 75 to accommodate a light compression spring 76. One end of the spring seats on the collar and the other end abuts the inner end of member 67 as shown.

In order that the diaphragm 59 may be biased in a direction to oppose the externally applied force or in a direction to oppose that of the pressure applied to the diaphragm, the means 19 are provided. As shown, the means 19 comprises, preferably, a single turn spring 77, one end of which is retained in an annular groove 78 in the head 61, the other end being connected to an adjusting screw 80. The screw 80 has threaded engagement with an internally threaded member 81 disposed in a bore 82 in the head of the bonnet. The member 81 is provided with a sealing ring 83, and is prevented from moving longitudinally of the bore 82 by means of an annular groove 85 in member 81 and a retaining screw 86 having a rounded end that registers in the groove. The outer end of member 81 is slotted to accommodate a screwdriver. Thus, by turning the member 81 right or left, the free end of the spring 77 may be pushed inwardly to exert an outward compressive force on the diaphragm, or the spring may be pulled towards the head of the bonnet thereby biasing the diaphragm inwardly of the chamber in the bonnet. When the tension of the spring acts inwardly on the diaphragm, the valve inlet port is biased to open position so that a pressure is required in the bonnet chamber of sufficient value to balance the force of the spring. On the other hand, if the force of the spring acts outwardly on the diaphragm, the valve is biased to close the inlet port and open the exhaust port. In that case, an external force exceeding the spring is required to close exhaust port and open the inlet port. Thus, it is possible to have the pressure in the chamber of the bonnet at a value of 3, 4 or 5 pounds per square inch when the externally applied force to the diaphragm is zero. Conversely, if the tension is acting outwardly on the diaphragm, the output pressure of the valve will be zero gauge until the external force exceeds the spring force on the diaphragm.

By means of the valve assembly shown, the pressure supply may be connected to the supply port 73 instead of to the valve assembly, which is customary. Thus, the valve may be adjusted without disturbing that connection. All that is required is to adjust the member 67 inwardly or outwardly of the bore in the bonnet head to the amount required to cause the valve ports to be closed when the beam 12 is in neutral position and the biasing force of the means 19 is at zero or neutral value. Also the internal bias on the diaphragm may be changed or adjusted externally of the bonnet housing without in any way disassembling the assembly 17.

The areas of diaphragms 59 and 36' may be equalized in the same manner that the effective areas of diaphragms 36 and 43 are equalized. This equalization is accomplished by means of wedges 90 and 91 disposed to engage beam 12 at the bottom and the top respectively. By loosening one of the wedges as by backing out the screw 92 or 93 and tightening the other screw, the rigid diaphragm connecting member 60 may be moved upwardly or downwardly. For example, if the screw 92 is backed out to free the wedge 90, and the screw 93 is turned inwardly, the wedge 91 may be moved to the position shown in Fig. 4 in which position the bottom of the aperture through which the beam 12 extends engages the bottom of the beam. This adjustment represents the maximum upward adjusting motion of the rigid member and in that maximum position, the effective areas of diaphragms 36' and 59 are at their maximum and minimum values, respectively.

Figure 3 shows the adjustment of diaphragms 36' and 59 in its extreme position in the opposite direction. As there shown, the connecting member 60 has been moved downwardly so that the top of the beam 12 engages the top of the aperture. In this position, the effective areas of diaphragms 36' and 59 are at their minimum and maximum values, respectively. By making intermediate adjustments of the wedges, intermediate adjustments of the diaphragm areas may be accomplished. When an adjustment has been made which equalizes the diaphragm areas, both set screws are tightened to lock member 60 to the beam 12.

In order to limit the maximum rotation of beam 12 about its fulcrum in either direction from neutral, stop screws 100 and 101 may be threaded through the base plate 11 to the extent necessary. Neutral position is that position in which the inlet and exhaust ports of the valve are closed.

The device 10 may be stabilized by means of a damping device 102. Such a device may be of the form and construction shown in the copending application of Ray S. Williams, Serial No. 627,639, filed December 11, 1956 and assigned to Hagan Chemicals and Controls, Incorporated.

Operation

Before placing the totalizer 10 in operation, and before checking the device to see whether or not the effective areas of the diaphragms of units 14 and 15 and 16 and 17 are equal, beam 12 is placed in a horizontal position with respect to the base level, or in a position where it is parallel to base 11. The beam may then be held in that position by the limit stops 100 and 101. If under those conditions there is pressure at the output of unit 17, the member 67 is turned outwardly until the inlet port thereof is closed. After that adjustment, both the exhaust port and the inlet port are closed.

In order to check the effective areas of the diaphragms, the stop screws are first backed away from the beam 12, and checking is performed in the manner indicated in the following.

The units 14, 15 and 16 of the totalizer may receive input pressures P1, P2 and P3, respectively, and develop a balancing output signal pressure P4.

If it be assumed that the lever arm L1 is the distance from the centers of diaphragms 36 and 43 to fulcrum strip 31, and that lever arm L2 is the distance from the centers of diaphragms 36' and 59' to the fulcrum strip, and that the effective areas of diaphragms 36, 43, 36' and 59 are equal and of unit value, the beam 12 would be in neutral position when the sum of the moments of the forces developed by pressures P1, P2, P3 and P4 is equal to zero. The following equations show the principle. In these equations, clockwise and counterclockwise turning moments are considered as plus and minus, respectively.

With the above assumptions:

(1) $P2L1 - P1L1 + P3L2 - P4L2 = 0$ (2) $-P4L2 = P1L1 - P2L1 - P3L2$ (3) $P4L2 = P2L1 - P1L1 + P3L2$ (4) $P4 = \frac{P2L1}{L2} - \frac{P1L1}{L2} + \frac{P3L2}{L2}$ (5) $P4 = \frac{L1}{L2}(P2 - P1) + P3$ (6) $\frac{L1}{L2}$ is the ratio of the lever arms and may be considered as a constant $K$. ∴ when $L1$ is equal to $L2$ (7) $P4 = (P2 - P1) + P3$ In order that P4 may be equal to P2 when $L1/L2$ is equal to unity, the effective areas of diaphragms 43 and 59 must be equal. This equality can be checked by supplying a pressure P2x to unit 15. If the diaphragm areas are equal, the output pressure P4 will be equal to P2x. If pressure P4 is greater than pressure P2x, the area of diaphragm 43 is decreased by means of the wedges, as described supra.

Likewise, the areas of diaphragms 36 and 43 can be checked for equality by applying a pressure Px to unit 15. That pressure will establish a pressure P4 in unit 17. Then, if, by supplying a pressure Py to unit 14 and increasing it to a value equal to pressure Px, the pressure P4 decreases to zero, the effective areas of diaphragms 36 and 43 are known to be equal. If the output pressure P4 is greater than zero gauge at equal pressures on diaphragms 36 and 43, the area of diaphragm 43 is thus shown to be greater than that of diaphragm 36. Adjustment is then made in the wedges until equality is reached.

In the same manner, the areas of diaphragms 36' and 59 may be equalized.

When the diaphragms have been equalized for area, or if faulty operating conditions exist, the valve member 67 is adjusted until both the exhaust and inlet ports are closed by stem 64.

The foregoing adjustments and checks having been made, the biasing means 22 may be adjusted for plus or minus bias. Thus, if it is desired that pressure P4 be equal to Pb in pounds per square inch when the input pressures P1, P2 and P3 are zero, member 81 is turned until spring 77 exerts an inward force on diaphragm 59 equal in value to the force of pressure Pb. Thus the output pressure P4 will vary from Pb to the value of the pressure of the supply to the valve.

When a negative bias is desired, member 81 is turned in the opposite direction until the desired bias is achieved. In that case, the force applied by clockwise motion of beam 12 to diaphragm 59 must exceed that of spring 77 before the output pressure P4 will rise from zero gauge to a value sufficient to equalize the force applied by beam 12.

From the foregoing, it is seen that a simple and efficient means for equalizing effective diaphragm areas, and novel and effective biasing means for diaphragm operated valves have been provided. There is also provided a simple poppet valve construction that admits of accurate adjustment without any interference from the supply pipe.

Having thus described the invention, it will be apparent to those of ordinary skill in the art to which the invention pertains, that various changes and modifications may be made in the illustrated embodiments, without departing from either the spirit or the scope of the invention.

Therefore, what is claimed as new and desired to be secured by Letters Patent is:

1. Means for equalizing the effective areas of diaphragm assemblies disposed to actuate a common member in accordance with the difference between the pressures in said assemblies, each of said assemblies comprising a housing having a diaphragm subjected to pressure on one side, the diaphragms facing each other and being connected by a rigid member, an actuated member having a loose connection with said rigid member, and means for equalizing the effective areas of the diaphragms, said means comprising means for moving said diaphragms simultaneously, one towards and the other away from the actuated member, said means including means for causing said moving means to clamp the rigid member to said actuated member.

2. Means as in claim 1 in which the rigid member is provided with a slot that is elongated in a direction normal to said diaphragms and that the diaphragm equalizing means comprises wedges located in said slot on opposite sides of the actuated member, said wedges being actuatable to selectively simultaneously move the rigid member and the diaphragms connected thereto in either direction to the extent necessary to equalize the areas of said diaphragms.

3. A device comprising a beam having a fulcrum and a pair of pressure receiving housings disposed on the same side of the fulcrum but on opposite sides of the beam, each housing having a diaphragm facing the beam, a rigid member connecting said diaphragms to each other and having an aperture through which the beam extends, the aperture being larger than the beam and means for equalizing the effective areas of the diaphragms comprising adjustable wedge members adjacent opposite sides of the beam for simultaneously actuating the rigid member and said diaphragms whereby one diaphragm is moved inwardly and the other outwardly of its associated housing thereby increasing the effective area of the former and decreasing the effective area of the latter.

4. A device as in claim 3 in which a second pair of housings are provided and disposed on the other side of the fulcrum and acting on opposite sides of the beam, each housing having a diaphragm facing the beam, a rigid member connecting each diaphragm and having an aperture through which the beam extends, the aperture being larger than the beam, and means for equalizing the effective areas of said diaphragms, said equalizing means comprising adjustable wedge members disposed on opposite sides of the beam for simultaneously actuating the rigid member and the diaphragms relative to the beam, whereby one diaphragm is moved inwardly and the other outwardly of its associated housing thereby increasing the effective area of the former and decreasing the effective area of the latter.

References Cited in the file of this patent

UNITED STATES PATENTS

| | | |
|---|---|---|
| 1,992,048 | Temple | Feb. 19, 1935 |
| 2,261,462 | Gabalis | Nov. 4, 1941 |
| 2,285,540 | Stein et al. | June 9, 1942 |
| 2,304,783 | Donaldson | Dec. 15, 1942 |
| 2,505,981 | McLeod | May 2, 1950 |
| 2,669,129 | Williams | Feb. 16, 1954 |
| 2,671,433 | Meddock | Mar. 9, 1954 |
| 2,667,385 | Markson | May 4, 1954 |
| 2,787,255 | Mercier et al. | Apr. 2, 1957 |
| 2,825,361 | Seljas | Mar. 4, 1958 |
| 2,882,916 | Ochs | Apr. 21, 1959 |